(12) United States Patent
Aliyev

(10) Patent No.: US 9,365,665 B2
(45) Date of Patent: Jun. 14, 2016

(54) POLYMERISATION OF ETHYLENE IN THE PRESENCE OF A SILYLCHROMATE BASED CATALYST

(71) Applicant: SAUDI BASIC INDUSTRIES CORPORATION, Riyadh (SA)

(72) Inventor: Vugar O. Aliyev, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 202 days.

(21) Appl. No.: 14/133,201

(22) Filed: Dec. 18, 2013

(65) Prior Publication Data

US 2014/0171605 A1 Jun. 19, 2014

(30) Foreign Application Priority Data

Dec. 19, 2012 (EP) ..................... 12075139

(51) Int. Cl.
*C08F 110/02* (2006.01)
*C08F 10/00* (2006.01)

(52) U.S. Cl.
CPC ............... *C08F 110/02* (2013.01); *C08F 10/00* (2013.01)

(58) Field of Classification Search
None
See application file for complete search history.

(56) References Cited

U.S. PATENT DOCUMENTS

| | | | |
|---|---|---|---|
| 3,324,095 A | 6/1967 | Carrick et al. | |
| 3,324,101 A | 6/1967 | Baker et al. | |
| 3,642,749 A | 2/1972 | Johnson et al. | |
| 3,704,237 A | 11/1972 | Suh | |
| 6,673,736 B2 | 1/2004 | Kellum et al. | |
| 2009/0306317 A1* | 12/2009 | Palackal | C08F 10/00 526/126 |

FOREIGN PATENT DOCUMENTS

WO 2010115613 A1 10/2010

OTHER PUBLICATIONS

Cann et al.; "Comparison of Silyl Chromate and Chromium Oxide Based Olefin Polymerization Catalysts"; Marcromol. Symp.; vol. 213; 2004; pp. 29-36.
Extended European Search Report; European Application No. 12075139.1; Mailing Date: May 2, 2013; 6 Pages.
Hoff et al.; "Silica-Supported Silyl Chromate-Based Ethylene Polymerization Catalysts"; Handbook of Transition Metal Polymerization Catalysts; 2010; p. 447.
Peacock et al.; "Handbook of Polyethylene: Structures, Properties, and Application"; Chapter 3: Production Processes; 2000; 26 Pages.

* cited by examiner

*Primary Examiner* — Ling Choi
*Assistant Examiner* — Catherine S Branch
(74) *Attorney, Agent, or Firm* — Cantor Colburn LLP

(57) ABSTRACT

The invention relates to a process for the production of high density polyethylene by polymerization of ethylene in the presence of a silylchromate based catalyst and a reducing agent is characterized in that the reducing agent comprises the reaction mixture of an alkyl aluminum compound and/or boron compound and a nitrogen containing compound. The alkyl aluminum compound is an organo aluminum compound having the formula $AlR_3$, in which R is a hydrocarbon radical containing 1-10 carbon atom and the nitrogen containing compound comprises —$NH_2$, —NHR, —$NR_2$, wherein R may be alkyl or a substituted alkyl having from 1 to 40 carbon atoms.

19 Claims, No Drawings

POLYMERISATION OF ETHYLENE IN THE PRESENCE OF A SILYLCHROMATE BASED CATALYST

CROSS REFERENCE TO RELATED APPLICATIONS

The present application claims priority to European Application No. 12075139.1, filed Dec. 19, 2012, the contents of which are incorporated herein in their entirety by reference.

The invention is directed to a process for the production of high density polyethylene by polymerisation of ethylene in the presence of a silylchromate based catalyst and reducing agent.

The production processes of LDPE, HDPE and LLDPE are summarised in "Handbook of Polyethylene" by Andrew Peacock (2000; Dekker; ISBN 0824795466) at pages 43-66. The catalysts can be divided in three different subclasses including Ziegler Natta catalysts, Phillips catalysts and single site catalysts. The various processes may be divided into solution polymerisation processes employing homogeneous (soluble) catalysts and processes employing supported (heterogeneous) catalysts. The latter processes include both slurry and gas phase processes.

The polymerisation of ethylene with supported chromium based catalysts is disclosed by Kevin Cann in "Comparison of silyl chromate and chromium oxide based olefin polymerisation catalysts" (Macromolecular Symp, 2004, 213, 29-36). This publication elucidates that there is a clear difference between chromium oxide based catalysts (Philips catalysts) and silylchromate based catalysts. The silylchromate catalyst consists of silylchromate (bis-triphenylsilyl chromate) absorbed on dehydrated silica and subsequently reduced with for example diethylaluminium ethoxide. The use of silyl chromate as a polymerization catalyst for olefin polymerization is disclosed in for example U.S. Pat. No. 3,324,095, U.S. Pat. No. 3,324,101 and U.S. Pat. No. 3,642,749. Although similar in structure the oxo and triphenylsilyl chromate catalyst perform very differently in polymerisation reactions. Silylchromate-based catalysts generally produce desirable polyethylenes relative to those produced by chromium oxide-type catalysts. Silylchromate produced polyethylenes generally have a broader molecular weight distribution than those produced using chromium oxide-type catalysts. The broader molecular weight distribution leads to better processability of the resulting polyethylene whereas the productivity of polymerisations (gPE/g catalyst) with silylchromate-based catalysts is relatively low in comparison with chromium oxide-based catalysts.

Various attempts have been made to increase the productivity of the catalyst.

U.S. Pat. No. 3,704,237 discloses an improved catalyst useful for preparing high density olefin polymers in improved yields, and in some cases, with reduced swell properties, is prepared by depositing a chromate ester catalyst on activated silica and then treating the resulting composition with selected organo-metallic reducing agents at elevated temperatures. The organometallic reducing agents which are used with the supported chromate ester catalysts have the structure $M(R_1')_a(R_2'')_b$ wherein M is a metal selected from group consisting of aluminium, gallium and magnesium. $R_1'$ is a saturated or unsaturated hydrocarbon group containing from 1 to 20 carbon atoms; $R_2''$ is $R_1'$ or H. Based on the patent, the improvements in polymer yields of the order of 2 to over 10 times may be obtained by using the reducing agents of the present invention at elevated reducing temperatures without deleteriously effecting the physical properties of the resulting polymers.

U.S. Pat. No. 6,673,736 B2 discloses an improved chromate catalyst using a highly porous silica support having high surface area and total pore volume. According to the invention, it has been found that the highly porous silica support allows effective loading of the chromate promoter at higher levels than conventional supports which resulted an increase total catalyst productivity that is equal to about twice that seen using conventional silyl chromate catalysts.

U.S. Pat. No. 3,642,749 discloses ethylene polymers of broad molecular weight distribution are obtained from a catalyst system comprising a supported hindered di-tertiary polyalicyclic chromate ester treated with an organometallic reducing agent such as diethylaluminium ethoxide (DEALE) was used which shows that the produced polymers have a significantly higher intrinsic viscosity and therefore a broader molecular weight distribution.

Ray Hoff et al (Handbook of Transition Metal Polymerization Catalysts, John Wiley & Sons, 2010, pp. 447) disclose that dialkyl aluminium alkoxides are preferred reducing agents. While both the trialkyl and dialkyl-ethoxy aluminium compounds increase the productivity of the catalyst, dialkyl aluminium alkoxides lower the molecular weight of the polyethylene polymers made with silyl chromate catalysts. The trialkyl aluminium reducing agents increase the polymer molecular weight. Reduction with DEALE produces a catalyst that makes polymers, in both slurry and gas-phase processes, that have molecular weights that are useful for many high-density polyethylene (HDPE) applications.

The amount of silylchromate deposited on the final catalyst has a major effect on catalyst activity. The activity of the catalyst generally increases with an increase in the chromium loading. However this adversely affects the molecular weight of the produced resin, such as a higher chromium loading in the catalyst is significantly increase the FI (Flow Index) of the produced HDPE resin. Reduction in the molecular weight of the resin is not desirable for the blow molded articles such as large size blow molded articles for example closed-head shipping containers, fuel tanks and containers for industrial use and high molecular weight film applications.

In order to compensate the decrease in the molecular weight of the produced polymer resin, the reactor temperature must be reduced below the operating regions (98-102° C.) which eventually results in significant reduction or lose the catalyst activity. Therefore, the optimum chromium loading for the conventional silylchromate based catalyst (for a given limited silica support surface area) which gives relatively good catalyst productivity and maintaining good bed temperature ranges (98-102° C.) is between about 0.25-0.29 wt % only. Since an increase in the molecular weight normally improves the physical properties of polyethylene resins, there is a strong demand for polyethylene having relatively high molecular weight. However, the polyethylene with high molecular weight is more difficult to process. The broader molecular weight distribution leads to better processability of the resulting polyethylene resin.

It is the object of the present invention to develop a highly active silylchromate based catalyst for the polymerization or co-polymerisation of olefin, preferably ethylene, with similar or improved resin properties for example higher molecular weight and broader molecular weight distribution compared to the conventional silylchromate based catalyst. The catalyst must also result in a high productivity of the ethylene polymerization with similar or improved resin properties.

The process for the production of high density polyethylene by polymerisation of ethylene in the presence of a silylchromate based catalyst and a reducing agent is characterized in that the reducing agent comprises the reaction mixture of an alkyl aluminium compound and/or a boron compound and a nitrogen containing compound.

The process according to the invention results in an improvement of the productivity of supported silylchromate catalysts for the polymerization of ethylene.

The combination of the silylchromate based catalyst and the specific reducing agent comprising the reaction product of the alkyl aluminium compound and/or a boron compound and nitrogen containing compound results in a higher molecular weight and broader molecular weight distribution of the polyethylene.

Furthermore the combination of the silylchromate on silica catalyst and the reducing agent results in a high activity of the ethylene polymerization process.

Another advantage is that the catalyst is more stable towards poisons, such as oxygen and moisture.

A very important advantage of the use of the composition comprising a silylchromate based catalyst and the specific reducing agent in the process according to the invention is the possibility to increase the catalyst productivity by increasing the chromium loading up to for example 1% by weight without having a negative effect on the properties of the polymer. In contrast, in a process without the use of said composition the increase of the chromium loading up to for example 1% by weight has a negative effect on properties of the polymer.

According to a preferred embodiment of the invention the alkyl aluminium compound is an organo aluminium compound having the formula $AlR_3$, in which R is a hydrocarbon radical containing 1-10 carbon atom and wherein the nitrogen containing compound comprises —$NH_2$, —NHR', —NR'$_2$, wherein R' may be alkyl or a substituted alkyl having from 1 to 40 carbon atoms. R may be the same or different. The hydrocarbon radical may be an alkyl, alkenyl, alkynyl and aryl. Preferably the hydrocarbon radical is alkyl.

The catalyst system according to the present invention is prepared by the reaction of the silylchromate (component a) with a porous support (component b) and then by a reaction with a reducing agent (component c).

The silylchromate present in the catalyst is bis(triphenylsilyl) chromate.

The catalyst components or their reaction products are anchored to the support surface. According to a preferred embodiment of the invention the support is silica.

The silica may have a surface area (SA) larger than 150 $m^2/g$ and pore volume (PV) larger than 0.8 $cm^3/g$. The support may be modified so as to include cogels such as for example silica-titania or silica-alumina and by the replacement of silica by alumina or amorphous aluminium phosphates. The silica support may also be doped with chemical compounds containing for example aluminium, titanium, phosphorus, boron or fluor. An example of a suitable support for the preparation of silylchromate based catalyst is Grace 955 silica.

According to a further preferred embodiment of the invention water and other volatile compounds are removed from the support before interaction with the catalytic components by heat activation of the support in a stream of an inert gas. An example of a suitable inert gas is nitrogen.

Preferably, the catalyst is an unmodified silica supported chromium based catalyst having a pore volume larger than 0.8 $cm^3/g$ and a specific surface area of at least 150 $m^2/g$.

The alkylaluminium compound may be selected from an organo aluminium compound having the formula $AlR_3$ in which R is a hydrocarbon radical containing 1-10 carbon atom. Suitable examples of organo aluminium compound of the formula $AlR_3$ include trimethyl aluminium, triethyl aluminium, triisobutyl aluminium, tri-n-hexyl aluminium and/or tri octyl aluminium. Preferably trimethyl aluminium, triethyl aluminium and/or triisobutyl aluminium is applied.

Examples of suitable nitrogen containing compound include nitrogen containing groups such as for example —$NH_2$, —NR'$_2$, wherein R' may be an alkyl or a substituted alkyl having from 1 to 40 carbon atoms, preferably from 1 to 20 carbon atoms. The nitrogen containing compound includes substituted derivatives thereof.

According to a preferred embodiment of the invention the nitrogen containing compound is a compound having the formula R—$NH_2$ in which R represents an alkyl having from 2 to 20 carbon atoms.

According to a further preferred embodiment of the invention the nitrogen containing compounds is decylamine, undecylamine, octylamine, octadecylamine, dodecylamine, N-methyloctadecylamine, N-ethyl-dodecylamine, hexadecylamine and/or N—N" dimethyl-n-octadecylamine.

More preferably the nitrogen containing compound is octadecylamine, dodecylamine and/or hexadecylamine.

The process according to the present invention does not comprise pyrrole-containing compounds such as for example hydrogen pyrrolide or pyrole, derivative of hydrogen pyrrolide and metal pyrrolide complexes because these compounds are unsuitable to be applied as the nitrogen containing compound.

Preferably the boron compound is a ($C_1$-$C_{10}$) alkyl boron compound or a ($C_5$-$C_{20}$) aromatic boron compound.

Suitable ($C_1$-$C_{10}$) alkyl boron compounds include for example trimethyl boron, triethyl boron and tripropyl boron.

Preferably, the alkyl boron compound is triethyl boron.

Generally, the molar ratio of aluminium to nitrogen ranges between 0.1:1 and 4:1.

Preferably, the molar ratio of aluminium to nitrogen ranges between 1:1 and 2:1.

Generally, the molar ratio of aluminium to chromium ranges between 0.1:1 and 25:1.

Preferably, the molar ratio of aluminium to chromium ranges between 0.1:1 and 10:1.

Generally, the amount of chromium (weight percent wt %) in the final catalyst ranges between 0.2:1 and 5:1, more preferably ranges between 0.5:1 and 2:1.

The amount of chromium in the final catalyst is generally more than 0.2% by weight and less than 2% by weight. Preferably the amount of chromium in the final catalyst ranges between 0.4% by weight and 1% by weight. More preferably the amount of chromium in the final catalyst is at least 0.5% by weight.

The polymerisation may be performed via a gas phase process or via a slurry process.

The polyethylene obtained with the process according to the invention is suited to be applied in the production of large size blow molded articles. Examples of blow molded articles which can be produced with the products according to the invention are closed-head shipping containers, fuel tanks and containers for industrial use.

Furthermore the products according to the invention may be applied in high molecular weight film applications.

WO2010115613 discloses a process wherein high density ethylene polymer is obtained by polymerizing ethylene in the presence of a supported chromium oxide based catalyst and an activator comprising a reaction mixture of a boron compound and/or an alkyl aluminum compound and a nitrogen containing compound. The combination of the supported chromium oxide based catalyst and the specific activator comprising the reaction product of the boron compound and/or the alkyl aluminum compound and a nitrogen containing compound results in a broader MWD of the polyethylene. Furthermore the combination of the chromium catalyst and the activator results in a high productivity of the high density ethylene polymerisation process. WO2010115613 elucidates the clear difference between a chromium oxide based catalyst being obtained by calcining a chromium compound carried on an inorganic oxide carrier in a non-reducing atmosphere and a silyl chromate catalyst which consists of silylchromate (bis-triphenylsilyl chromate) absorbed on dehydrated silica and subsequently reduced with for example diethylaluminum ethoxide. Although similar in structure the oxo and triphenylsilyl chromate catalyst perform very differently in polymerisation reactions. According to WO10115613, preferably the catalyst and the reaction mixture of aluminium compound and amine activator are injected separately to the reactor.

U.S. Pat. No. 3,324,095 discloses the polymerization of ethylene in the presence of a silylchromate catalyst and a small amount of an organo aluminium compound having one or two oxy hydrocarbyl groups attached to the aluminium atom. U.S. Pat. No. 3,324,095 does not use a nitrogen containing compound. In the examples of U.S. Pat. No. 3,324,095 the amount of chromium in the final catalyst is 0.0.16% by weight and 0.2% by weight.

The invention will be elucidated by means of the following non-limiting examples.

EXAMPLES

In the following flow index and molecular weights are determined by:

Flow Index:
HLMI (High Load Melt Index) Test Method ASTM D 1238 Condition F measured at 190° C. under a load of 21.6 kg and the results are given in g/10 minutes.

Gel Permeation Chromatography (GPC):
Polymer molecular weight and its distribution (MWD) were determined by Polymer Labs 220 gel permeation chromatograph. The chromatograms were run at 150° C. using 1,2,4-trichlorobenzene as the solvent with a flow rate of 0.9 ml/min. The refractive index detector is used to collect the signal for molecular weights. The software used is Cirrus from PolyLab for molecular weights from GPC. The calibration of the HT-GPC uses a Hamielec type calibration with broad standard and fresh calibration with each sample set.

Experiment I: Catalyst Preparation
The catalyst was prepared by placing 0.5 g of previously dehydrated silica (Silica 955 of Grace) (600° C.) in a vial. Then 30 ml of dry degassed isopentane was added into the vial. 0.030 g of bis-triphenylsilyl chromate was added and the mixture was stirred for 1 hour at 50° C. The colour of the silica was turned to orange. After the deposition of the bis-triphenylsilylchromate on the activated silica support was completed, as evidenced by the disappearance of colour in the solvent, the reducing agent was added via syringe. The colour of the slurry was turned to green immediately. The resulting reduced catalyst slurry was then used in the polymerisation reactions as disclosed below. The chromium loading in the final catalyst was 0.5 wt %.

Experiment II: Preparation of the Reducing Agent Comprising the Reaction Mixture of an Alkyl Aluminium Compound and a Nitrogen Containing Compound Under a dry nitrogen atmosphere, a Schlenk flask was charged with triisobutyl aluminium (TIBAL) and a hexane solution (temperature 65° C.) of octadecylamine ($C_{18}H_{37}NH_2$). The compounds were mixed to form a colour solution.

Examples I-V

Ethylene Polymerization

The polymerisation reaction was carried out in a two liters stirred autoclave reactor in deoxygenated isopentane in the absence of any (alkyl aluminium or alkyl boron) scavenger. The polymerisation reaction in the presence of the catalyst according to Experiment I and the reducing agent according to Experiment II was conducted at 100° C. and 20 bars (290 psi) of total pressure. Ethylene polymerisation was carried out for 1 hour, with ethylene supplied on demand to maintain the total reactor pressure at 20 bar. Upon completion of the polymerisation, the reactor was vented and cooled to ambient temperature to recover the polymer.

TABLE 1

| | TIBAL + Octadecyl amine/Cr molar ratio | Mw | Mn | MWD | Mz | Mz + 1 | Mz/Mw | HLMI |
|---|---|---|---|---|---|---|---|---|
| I | 2.5 | 345733 | 11534 | 29.97 | 3103397 | 5571115 | 8.97 | 6.3 |
| II | 2.97 | 358020 | 12523 | 28.58 | 3037799 | 5521226 | 8.48 | 5.1 |
| III | 3.4 | 309738 | 12351 | 27.2 | 2821541 | 5307688 | 9.1 | 9.9 |
| IV | 3.8 | 280191 | 10505 | 26.67 | 2333657 | 4727190 | 8.32 | 7.1 |
| V | 4.2 | 255856 | 10234 | 25 | 2020407 | 4178293 | 7.89 | 6.6 |

(TIBAL + Octadecylamine column header above ratios)

TABLE 2

| | Yield PE (gm) | Catalyst Prod. (g PE/g cat · hr) | Bulk Density (g/cc) |
|---|---|---|---|
| I | 103 | 206 | 0.38 |
| II | 231 | 462 | 0.38 |
| III | 223 | 446 | 0.39 |
| IV | 210 | 420 | 0.40 |
| V | 190 | 380 | 0.40 |

In Table 1:

Mz and Mz+1 are higher average molecular weights

Mw: weight-average molecular weight

Mn: number-average molecular weight

MWD (molecular weight distribution) is the ratio of weight-average molecular weight (Mw) to number-average molecular weight (Mn), i.e., Mw/Mn and used as a measure of the broadness of molecular weight distribution of a polymer.

wherein
- Mw is related to strength properties (tensile, impact resistance).
- Mn is related to brittleness, flow properties.
- Mz is related to elongation and flexibility.
- Mz+1 is related to die swell.

The flex life is directly related to the Z-average molecular weight. The Z-average is located at the extremely high molecular weight end of the distribution.

Mz/Mw is indicative of the high molecular weight shoulder; as Mz/Mw increases, the desirable high molecular weight shoulder becomes more pronounced.

Table 2 shows the influence of the TIBAL+Octadecyl amine/Cr molar ratio on catalyst productivity.

Examples III and VI-VII

Example III is repeated with the exception that in Examples VI-VII the amount of silyl chromate is changed. Tables 3 and 4 show the influence of the amount of silyl chromate on the catalyst productivity and bulk density (Table 3) and the polymer molecular properties.

TABLE 3

| | Silyl chromate (mg) | TIBAL + Octadecyl amine/Cr molar ratio | Yield (gm) | Catalyst Prod. (g PE/g cat · hr) | Bulk Density (g/cc) |
|---|---|---|---|---|---|
| III | 30 | 3.4 | 223 | 446 | 0.39 |
| VI | 45 | 3.4 | 245 | 490 | 0.38 |
| VII | 60 | 3.4 | 308 | 616 | 0.38 |

TABLE 4

| | Silyl chromate (mg) | TIBAL + Octadecyl amine/Cr molar ratio | Mw | Mn | MWD | HLMI |
|---|---|---|---|---|---|---|
| III | 30 | 3.4 | 309738 | 12351 | 27.2 | 9.9 |
| VI | 45 | 3.4 | 317400 | 11500 | 27.6 | 7.3 |
| VII | 60 | 3.4 | 342000 | 12000 | 28.5 | 5.98 |

Comparative Examples A-D

Ethylene Polymerization

Examples III-V were repeated with the exception that as reducing agent TIBAL was applied. (Comparative Examples A-C). Additionally in Comparative Example D an experiment with TIBAL/Cr molar ratio of 4.6 was performed.

Comparing Table 1 and Table 5 shows that adding only TIBAL as a reducing agent results in an increase of molecular weight only, without broadening molecular weight distribution of the resin. The reaction product of TIBAL and octadecylamine which is produced prior to introduction into the silylchromate based catalyst as a reducing agent, increases the molecular weight of the produced resin and results in a broader molecular weight distribution with desirable high Mw shoulder as well, which is indicated by the Mz/Mw value.

Mn values within the range of 10,000-13,000 and higher Mz, Mz+1 and Mz/Mw values clearly shows that the material perfectly fit for large size blow molding containers applications.

The invention claimed is:

1. A process for the production of high density polyethylene, comprising:
    polymerizing ethylene in the presence of a silylchromate based catalyst and a reducing agent to produce the high density polyethylene;
    wherein the reducing agent comprises the reaction mixture of an alkyl aluminium compound and/or a boron compound, and a nitrogen containing compound.

2. The process according to claim 1, wherein the reducing agent comprises the reaction mixture of the alkyl aluminium compound and the nitrogen containing compound.

3. The process according to claim 2, wherein the alkyl aluminium compound is an organo aluminium compound having the formula $AlR_3$, in which R is a hydrocarbon radical containing 1-10 carbon atom and wherein the nitrogen containing compound comprises $-NH_2$, $-NHR'$, $-NR'_2$, wherein R' may be alkyl or a substituted alkyl having from 1 to 40 carbon atoms.

4. The process according to claim 1, wherein the catalyst is prepared by the reaction of the silylchromate with a porous support and then by a reaction with the reducing agent.

5. The process according to claim 4, wherein the porous support is silica.

6. The process according to claim 1, wherein the silylchromate is bis(triphenylsilyl) chromate.

7. The process according to claim 1, wherein the reducing agent comprises the alkyl aluminium compound, and wherein the alkyl aluminium compound has the formula $AlR_3$ and is trimethyl aluminium, triethyl aluminium and/or triisobutyl aluminium.

8. The process according to claim 7, the alkyl aluminium compound is triisobutyl aluminium.

9. The process according to claim 1, wherein the nitrogen containing compound is selected from decylamine, undecylamine, octylamine, octadecylamine, dodecylamine, N-methyloctadecylamine, N-ethyl-dodecylamine, hexadecylamine and N—N' dimethyl-n-octadecylamine, and mixtures thereof.

10. The process according to claim 9, wherein the nitrogen containing compound is octadecylamine.

TABLE 5

| TIBAL | Al/Cr molar ratio | Mw | Mn | MWD | Mz | Mz + 1 | Mz/Mw | HLMI |
|---|---|---|---|---|---|---|---|---|
| A | 3.4 | 247259 | 12693 | 19.48 | 1614706 | 3050418 | 6.21 | 18.3 |
| B | 3.8 | 240256 | 12691 | 18.93 | 1689864 | 3486086 | 7 | 13.7 |
| C | 4.2 | 235348 | 12558 | 18.74 | 1387894 | 2645307 | 5.89 | 13.6 |
| D | 4.6 | 226039 | 13304 | 16.99 | 1263558 | 2516835 | 5.59 | 10.2 |

11. The process according to claim 1, wherein an amount of chromium in the final catalyst is 0.4% by weight to 1% by weight.

12. The process according to claim 1,
wherein the reducing agent comprises the reaction mixture of the alkyl aluminium compound and the nitrogen containing compound;
wherein the alkyl aluminium compound is an organo aluminium compound having the formula $AlR_3$, in which R is a hydrocarbon radical containing 1-10 carbon atom and wherein the nitrogen containing compound comprises $-NH_2$, $-NHR'$, $-NR'_2$, wherein R' may be alkyl or a substituted alkyl having from 1 to 40 carbon atoms;
wherein the catalyst was prepared by the reaction of the silylchromate with a porous silica support and then by a reaction with the reducing agent;
wherein the nitrogen containing compound is selected from decylamine, undecylamine, octylamine, octadecylamine, dodecylamine, N-methyloctadecylamine, N-ethyl-dodecylamine, hexadecylamine and N—N" dimethyl-n-octadecylamine, and mixtures thereof.

13. The process according to claim 12, wherein the silylchromate is bis(triphenylsilyl) chromate.

14. The process according to claim 12, wherein the reducing agent comprises the alkyl aluminium compound, and wherein the alkyl aluminium compound has the formula $AlR_3$ and is trimethyl aluminium, triethyl aluminium and/or tri-isobutyl aluminium.

15. The process according to claim 14, the alkyl aluminium compound is triisobutyl aluminium.

16. The process according to claim 12, wherein the nitrogen containing compound is octadecylamine.

17. The process according to claim 12, wherein an amount of chromium in the final catalyst is 0.4% by weight to 1% by weight.

18. An article prepared using the high density polyethylene obtained with the process according to claim 1.

19. A blow molded article prepared using the high density polyethylene obtained with the process according to claim 1.

* * * * *